(12) United States Patent
Zhang et al.

(10) Patent No.: US 9,338,519 B2
(45) Date of Patent: *May 10, 2016

(54) METHOD FOR MULTICAST VIDEO DELIVERY FOR 4G CELLULAR NETWORKS

(71) Applicant: NEC Laboratories America, Inc., Princeton, NJ (US)

(72) Inventors: Honghai Zhang, Seattle, WA (US); Jongwon Yoon, Princeton, NJ (US); Sampath Rangarajan, Bridgewater, NJ (US)

(73) Assignee: NEC Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/716,295

(22) Filed: Dec. 17, 2012

(65) Prior Publication Data

US 2013/0155935 A1 Jun. 20, 2013

Related U.S. Application Data

(60) Provisional application No. 61/576,592, filed on Dec. 16, 2011.

(51) Int. Cl.
*H04N 21/6405* (2011.01)
*H04N 21/2383* (2011.01)
*H04N 21/24* (2011.01)
*H04N 21/61* (2011.01)
*H04N 21/2662* (2011.01)
*H04W 72/04* (2009.01)

(52) U.S. Cl.
CPC ....... *H04N 21/6405* (2013.01); *H04N 21/2383* (2013.01); *H04N 21/2408* (2013.01); *H04N 21/6131* (2013.01); *H04N 21/2662* (2013.01); *H04W 72/04* (2013.01)

(58) Field of Classification Search
USPC ......................................... 370/312, 485, 486
See application file for complete search history.

(56) References Cited

U.S. PATENT DOCUMENTS

| | | | |
|---|---|---|---|
| 8,374,101 B2 * | 2/2013 | Li et al. | 370/252 |
| 2007/0218904 A1 * | 9/2007 | Park et al. | 455/436 |
| 2010/0269142 A1 * | 10/2010 | Li et al. | 725/62 |
| 2012/0213099 A1 * | 8/2012 | Cheng et al. | 370/252 |

* cited by examiner

*Primary Examiner* — Min Jung
(74) *Attorney, Agent, or Firm* — Joseph Kolodka

(57) ABSTRACT

A method for video multicast delivery for 4g wireless networks includes collecting client feedback and obtaining supportable modulation and coding scheme MCS for each client over a base station of wireless network, prioritizing video packets for said clients and setting a utility for each of the video packets; performing a radio resource allocation for determining a utility optimization for transmitted frames of the video packets; and assigning an MCS to each transmitted frame of the video packets, responsive to step performing a radio resource allocation.

8 Claims, 2 Drawing Sheets

METHOD FOR MULTICAST VIDEO DELIVERY FOR 4G CELLULAR NETWORKS

RELATED APPLICATION INFORMATION

This application claims priority to provisional application No. 61/576,592 filed Dec. 16, 2011, the contents thereof are incorporated herein by reference.

BACKGROUND OF THE INVENTION

The present invention relates generally to cellular communications, and more particularly, to a method for multicast video delivery for 4G cellular networks.

Although wireless broadband technologies have evolved significantly over the past decade, they are still insufficient to support fast growing mobile traffic, especially due to the increasing popularity of mobile video applications. Wireless multicast, aiming to exploit the wireless broadcast advantage, is a viable approach to bridge the gap between the limited wireless networking capacity and the ever-increasing mobile video traffic demand.

The problem is how to efficiently multicast videos to a group of clients. The video is non-scalable and is encoded using traditional technologies such as MPEG4 and H.264. Different users are under different channel conditions.

Others have studied the wireless multicast problem with scalable video coding (i.e., multi-layered video), while still others have studied the multicast problem in WiFi networks where radio resources are not allocated by a central controller. There has already been developed a graceful video multicast scheme that requires modifying the video encoding and part of the channel coding using rateless coding.

Accordingly, there is a need for a method for multicast video delivery for 4G cellular networks that overcomes limitations of prior video delivery solutions.

BRIEF SUMMARY OF THE INVENTION

The present invention is directed to a method for video multicast delivery for 4g wireless networks includes collecting client feedback and obtaining supportable modulation and coding scheme MCS for each client over a base station of wireless network, prioritizing video packets for said clients and setting a utility for each of the video packets; performing a radio resource allocation for determining a utility optimization for transmitted frames of the video packets; and assigning an MCS to each transmitted frame of the video packets, responsive to step performing a radio resource allocation These and other advantages of the invention will be apparent to those of ordinary skill in the art by reference to the following detailed description and the accompanying drawings.

DETAILED DESCRIPTION

The present invention to a method for multicast video delivery that is built on top of existing video encoding technologies. The inventive method performs radio resource allocation and MCS assignments to optimize the video transmission. It leverages the dependency relationship between P-frames and employs the dynamic-programming technique to prioritize video frames.

Figure 1:
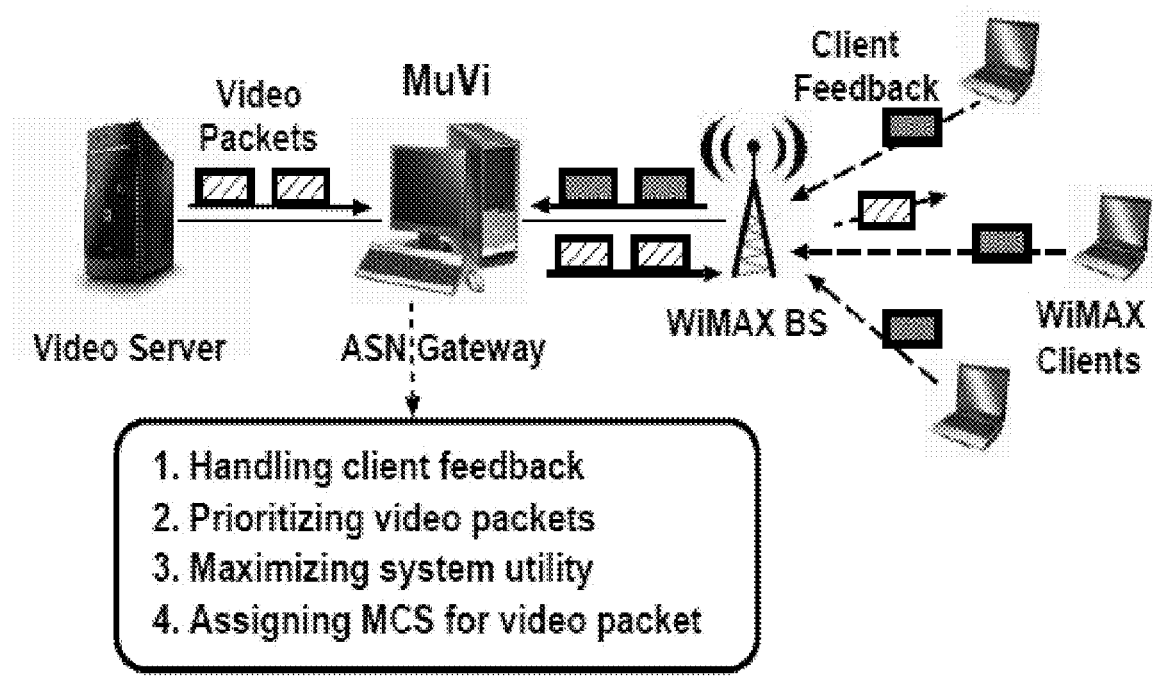
FIG. 1 is a block diagram of an exemplary wireless network for practicing the invention.

Referring to the diagram of FIG. 1, there is shown an exemplary wireless network for practicing the invention. A video server sends video packets over an ASN gateway, which is configured by the inventive method for multicast video delivery over a 4G cellular network. Video information is uploaded over the WiMax base station BS to multiple WiMax clients.

Figure 2:
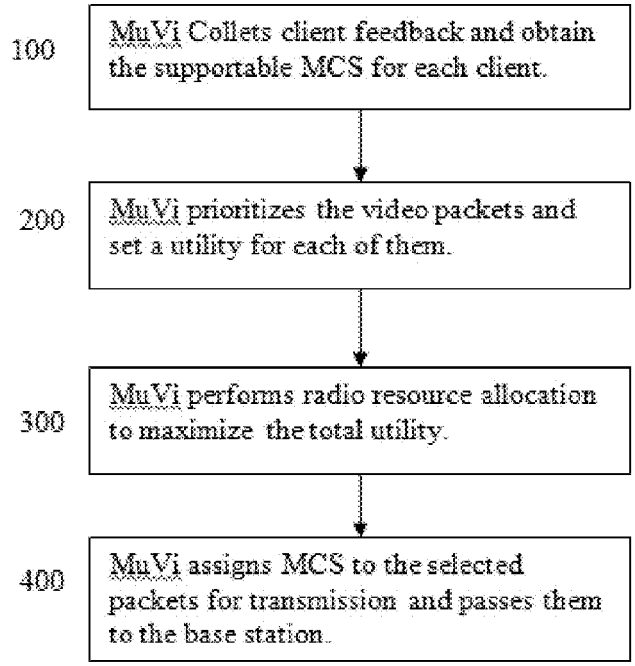
FIG. 2 is a flow diagram of key steps for multicast video delivery for 4G cellular networks, according to the invention.

Referring now to FIG. 2, there are four key steps in in the present invention, also referred to herein as MuVi. First, 100, the base station collects the client feedback, computes the moving average, aggregates the message, and sends to the ASN gateway, which determines the supportable modulation and coding scheme MCS for each client. Second, 200, the ASN gateway needs to prioritize the video packets based on their frame types and the number of frames depending on them. It assigns a utility to each video frame, which may also depend on the user profile, so the inventive method supports user differentiation. Experiments by applicants have shown that the utility of each frame is set to the number of video frames depending on it, including itself.

Third, 300, the inventive method performs radio resource allocation to maximize the total system utility. It may drop some video frames based on the result of resource allocation. Fourth, 400, the inventive method assigns MCSs to the selected video packets for transmission and passes them to the base station, which sends the packets over the air using the assigned MCSs.

The key aspects of the inventive method for video multicast delivery for cellular networks are the performing radio resource allocation 300 and assigning MCS to the selected packets for transmission and passes them to the base station.

Figure 3:
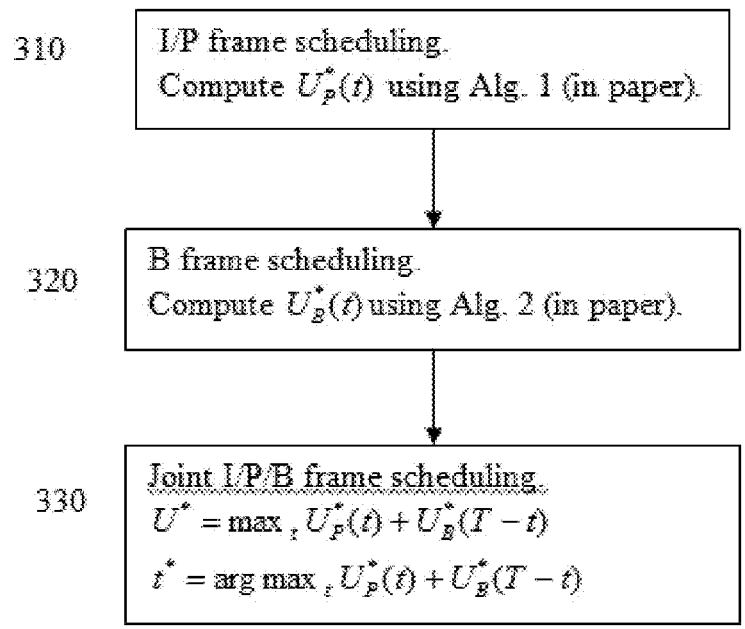
FIG. 3 is a diagram detailing radio resource allocation, block 300 shown in block in FIG. 2, in accordance with the invention.

Referring now to FIG. 3, details of the radio resource allocation aspects are shown in the flow diagram. Initially, 310, with respect to I/P scheduling, utilization maximization $U^*_P(t)$ is computed using algorithm 1, detailed on page 6 in the Appendix to this Application, entitled "Additional Information". Then, 320, for B frame scheduling, utilization maximization $U^*_B(t)$ is computed using algorithm 2, detailed in the Appendix to this Application, entitled "Additional Information". Also, for the joint I/P and B frame utilization, the total utilization $$U^* = \max_t U^*_P(t) + U^*_B(T-t) \text{ and } t^* = \arg\max_t U^*_P(t) + U^*_B(T-t).$$

To maximize the total utility considering available radio resources, the inventive method separates I/P frame scheduling and B frame scheduling. The goal is to transmit a GOP with total T slots. Assume that $t \leq T$ slots are allocated for transmitting I/P frames, and T-t slots are allocated for transmitting B frames. Utility maximization is described in section 3.3 detailed in the Appendix to the application entitled "Additional Information".

The MCS for each selected video frame is determined by backtracking based on the results obtained for the optimal utility. The steps for determining the MCSs are described in Sec 3.4 detailed in the Appendix to the application, entitled "Additional Information".

Figure 4:
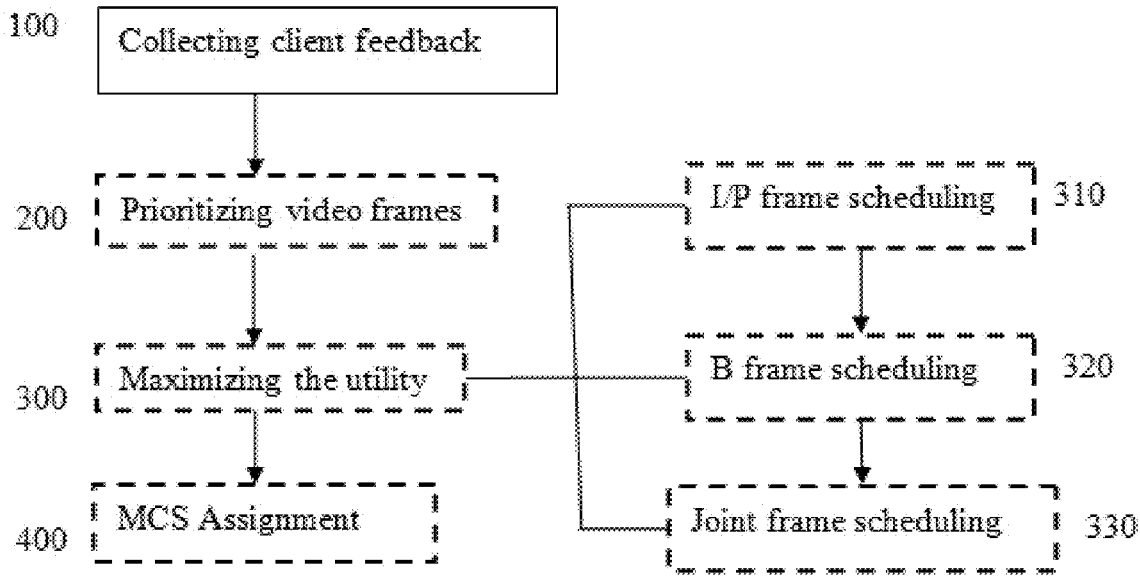
FIG. 4 is a diagram detailing key aspects of the inventive video multicast delivery for 4G cellular networks, shown in FIGS. 1-3.

Referring to FIG. 4, key aspects of the inventive method for video multicast delivery for 4G cellular networks is shown in the diagram. Collecting client feedback, video frames are prioritized, utility is maximized by the I/P frame scheduling, B frame scheduling and joint frame scheduling steps. Lastly, appropriate MCS assignment is undertaken.

From the foregoing, it can be appreciated that the present invention finds the near-optimal solution for the radio resource allocation and MCS assignments. The inventive method has low complexity and does not require modifying existing video encoding procedures or wireless air interface.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitle, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for video multicast delivery for 4 g wireless networks comprising:
    collecting client feedback and obtaining supportable modulation and coding scheme MCS for each client from a base station of the wireless network;
    prioritizing video packets for said clients and setting a utility value for each frame of said video packets;
    performing a radio resource allocation for the frames of the video packets to determine a utility value optimization for transmitted frames of said video packets; and
    assigning an MCS to each said transmitted frame of said video packets, responsive to said performed radio resource allocation.

2. The method of claim 1, wherein said performing said radio resource allocation further comprises determining utilization maximization for I/P frame scheduling.

3. The method of claim 2, wherein said performing said radio resource allocation further comprises determining utilization maximization for B frame scheduling.

4. The method of claim 3, wherein said performing said radio resource allocation further comprises performing joint scheduling for optimal resource allocation between I/P and B frames, with $$U^* = \max_t U_P^*(t) + U_B^*(T-t),$$

$$t^* = \mathrm{argmax}_t U_P^*(t) + U_B^*(T-t)$$

being optimal total utility and optimal total number of slots allocated to I/P frames, respectively, and T-t* being an optimal number of slots allocated to B frames.

5. The method of claim 2, wherein said I/P frame scheduling comprises:

(a) a recursive equation utilization maximization $U_P(j,m,t)$ defined by $$U_P(j, m, t) = \max_{0 \le i \le j} \left[ U_P(i, m-1, t-\tau_{i+1,j,m}) + \sum_{l=i+1}^{j} \sum_{k \in S_m} u_l^k \right]; \quad (2)$$

(b) initial conditions for utilization maximization $U_P(j,m,t)$ $U_P(j,m,t) = -\infty$, if $t<0$ $U_P(j,0,t) = -\infty$, if $j \ge 0$, $t \ge 0$ $U_P(-1,m,t) = 0$, if $m \ge 0$, $t \ge 0$ \quad (4)

(c) an optimal utility $U^*_P$ for each available time slot t:

$$U_P^*(t) = \max_{j \ge 0} U_P(j, M, t) \quad (5)$$

$$j^*(t) = \mathrm{argmax}_{j \ge 0} U_P(j, M, t)$$

$$m^*(t) = \min\{m : U_P(j^*(t), m, t) == U_P^*(t)\};$$

and
(d) I/P frame scheduling comprising
    1: Use Eq. (4) to compute the utility $U_P$ (j,m,t) at the boundary,
    2: for all j, m, t do
    3: Compute $U_P$ (j,m t) iteratively using Eq. (2),
    4: end for
    5: Find the optimal utility $U^*_P$ for all 0≤t≤T using Eq. (5).

6. The method of claim 5, wherein said B frame scheduling comprises
    1: for all m*(t)≤m≤M do
    2: Find the maximum $b_m$ such that the first $B_m$ frames in B(t) can be transmitted with MCS m in T-t slots,
    3: The resulting utility is $U_B(m,T-t)=\Sigma_{b=1}^{b_m}\Sigma_{k \in S_m} u_b^k$.
    4: end for
    5: Find the optimal $m_0$=arg max$_m U_B$(m,T-t) and obtain the utility $U^*_B$(T-t)=$U_B$ ($m_0$,T-t).

7. The method of claim 6, wherein said assigning an MCS comprises, with an I frame being viewed as a special P frame with index 0 for frames of said video packets to be transmitted:
    1 t* and T-t* (obtained from Eq. (6)) are the number of slots allocated to P frames and B frames, respectively,
    2 The first j*(t*) P frames (from Eq. (5)) are transmitted and the rest P frames are discarded.
    3 t =t*,j=j*(t*),m=m*(t*), i=q(j,m,t),
    4 P frames $P_l$,l=i+1, ... j are transmitted with MCS m(if i==j, no frames are transmitted with MCS m),
    5 If i<0, go to Step 6. Otherwise, t=t-$T_{i+1,j,m}$,j=i,m=m-1, i=q(j,m,t), go to step 4,
    6 $m_0$=arg max $_m$(m, T-t*). The first $b_{m_0}$ B frames are transmitted with MCS $m_0$ and the rest B frames are dropped.

8. The method of claim 7, wherein once said MCS for each video frame is determined, video packets belonging each frame are marked with an assigned MCS index in a field of an IP header.

* * * * *